(12) United States Patent
Ku et al.

(10) Patent No.: US 12,405,426 B2
(45) Date of Patent: Sep. 2, 2025

(54) OPTICAL ELEMENT

(71) Applicant: Industrial Technology Research Institute, Hsinchu (TW)

(72) Inventors: Kai-Ning Ku, Hsinchu County (TW); Ming-Hsien Wu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 206 days.

(21) Appl. No.: 18/070,413

(22) Filed: Nov. 28, 2022

(65) Prior Publication Data

US 2023/0168433 A1     Jun. 1, 2023

Related U.S. Application Data

(60) Provisional application No. 63/284,002, filed on Nov. 29, 2021.

(30) Foreign Application Priority Data

Nov. 16, 2022   (TW) .................................. 111143816

(51) Int. Cl.
G02B 6/30        (2006.01)
(52) U.S. Cl.
CPC ...................................... G02B 6/30 (2013.01)
(58) Field of Classification Search
None
See application file for complete search history.

(56) References Cited

U.S. PATENT DOCUMENTS

| | | | |
|---|---|---|---|
| 6,406,196 B1 * | 6/2002 | Uno | G02B 6/4214 385/47 |
| 6,925,238 B2 | 8/2005 | Lee et al. | |

(Continued)

FOREIGN PATENT DOCUMENTS

| | | |
|---|---|---|
| CN | 101010609 | 8/2007 |
| CN | 107346053 | 11/2017 |

(Continued)

OTHER PUBLICATIONS

"Office Action of Taiwan Counterpart Application", issued on Oct. 5, 2023, p. 1-p. 5.

(Continued)

Primary Examiner — Jerry Rahll
(74) Attorney, Agent, or Firm — JCIPRNET (57) ABSTRACT

An optical element includes a substrate, a first insulating layer, a first optical waveguide layer, a first edge coupler, and a first micro-optical element. The first insulating layer is disposed on the substrate. The first optical waveguide layer is disposed on the first insulating layer to transmit a light beam. The first edge coupler is disposed on the first insulating layer and coupled to an end of the first optical waveguide layer. The first micro-optical element is disposed on the substrate and includes a first inclined surface. The first micro-optical element is located within a first groove formed between the substrate, the first insulating layer, the first optical waveguide layer, and the first edge coupler. The light beam is sequentially transmitted from the first optical waveguide layer to the first edge coupler, emitted from the first edge coupler, and reflected by the first inclined surface to an optical fiber connector.

18 Claims, 5 Drawing Sheets

(56) References Cited

U.S. PATENT DOCUMENTS

| | | | |
|---|---|---|---|
| 7,224,174 B1 | 5/2007 | Malendevich et al. | |
| 8,855,452 B2 | 10/2014 | Andry et al. | |
| 9,459,177 B1 | 10/2016 | Dong et al. | |
| 9,588,298 B2 | 3/2017 | Novack et al. | |
| 9,759,634 B2* | 9/2017 | Pitwon | G01M 11/33 |
| 2003/0044119 A1* | 3/2003 | Sasaki | G02B 6/4246 385/49 |
| 2004/0013378 A1* | 1/2004 | Lee | G01M 11/35 385/125 |
| 2004/0114869 A1 | 6/2004 | Fike et al. | |
| 2004/0197052 A1* | 10/2004 | Toyoda | G02B 6/3636 385/137 |
| 2005/0244106 A1* | 11/2005 | Fukuyama | G02B 6/4249 385/48 |
| 2007/0263957 A1* | 11/2007 | Shimizu | G02B 6/30 385/14 |
| 2011/0073972 A1 | 3/2011 | Heck et al. | |
| 2012/0076465 A1 | 3/2012 | Chen et al. | |
| 2013/0182998 A1* | 7/2013 | Andry | G02B 6/4204 385/33 |
| 2014/0205234 A1 | 7/2014 | Rong et al. | |
| 2015/0285996 A1 | 10/2015 | Selvaraja | |
| 2016/0238801 A1* | 8/2016 | Lee | G02B 6/136 |
| 2017/0131469 A1* | 5/2017 | Kobrinsky | G02B 6/4257 |
| 2020/0363594 A1* | 11/2020 | Lu | G02B 6/4228 |

FOREIGN PATENT DOCUMENTS

| | | |
|---|---|---|
| CN | 112698448 | 4/2021 |
| JP | 2006178001 | 7/2006 |
| TW | 201346360 | 11/2013 |
| TW | 1489162 | 6/2015 |
| WO | 2013048411 | 4/2013 |
| WO | 2020246042 | 12/2020 |

OTHER PUBLICATIONS

Robert Polster et al., "Wafer-scale high-density edge coupling for high throuput testing of silicon photonics", 2018 Optical Fiber Communications Conference and Exposition (OFC), Mar. 11-15, 2018, pp. 1-3.

Mareike Trappen et al., "3D-printed optical probes for wafer-level testing of photonic integrated circuits", Optics Express, vol. 28, No. 25, Dec. 7, 2020, pp. 37996-38007.

* cited by examiner

OPTICAL ELEMENT

CROSS-REFERENCE TO RELATED APPLICATION

This application claims the priority benefit of U.S. provisional application Ser. No. 63/284,002, filed on Nov. 29, 2021, and Taiwan application serial no. 111143816, filed on Nov. 16, 2022. The entirety of each of the above-mentioned patent applications is hereby incorporated by reference herein and made a part of this specification.

TECHNICAL FIELD

The technical field relates to an optical element.

BACKGROUND

Data centers have increasing demands for equipment bandwidth and speed. In recent years, the co-packaged optics (CPO) architecture has emerged. As the bandwidth of network switches enters the 51.2T generation, the optical fiber packaging density will encounter a bottleneck. Therefore, wavelength division multiplexing (WDM) components need to be introduced into photonic chips to alleviate the optical fiber density issue.

Grating couplers have been used as the input/output couplers (I/O couplers) for photonic chips, but they are not suitable for use in series with wavelength division multiplexing components because of narrow optical bandwidth. On the contrary, an edge coupler has a large optical bandwidth and is suitable for connecting in series with wavelength division multiplexing components, but there remains a problem that the measurement efficiency is very low, making it difficult to be introduced into mass production.

SUMMARY

The disclosure provides an optical element which facilitates measurement and thus is suitable for mass production.

An exemplary embodiment of the disclosure provides an optical element including a substrate, a first insulating layer, a first optical waveguide layer, a first edge coupler, and a first micro-optical element. The first insulating layer is disposed on the substrate. The first optical waveguide layer is disposed on the first insulating layer and configured to transmit a light beam. The first edge coupler is disposed on the first insulating layer and coupled to an end of the first optical waveguide layer. The first micro-optical element is disposed on the substrate and includes a first inclined surface. A first groove is formed between the substrate, the first insulating layer, the first optical waveguide layer, and the first edge coupler. The first micro-optical element is located within the first groove. The light beam is sequentially transmitted from the first optical waveguide layer to the first edge coupler, emitted from the first edge coupler, and reflected by the first inclined surface to an optical fiber connector.

Based on the above, according to an embodiment of the disclosure, since the optical element is provided with the first edge coupler, the optical element is suitable for connecting wavelength division multiplexing components in series. Furthermore, the optical element is provided with the first micro-optical element and uses the first micro-optical element to couple the light beam to the optical fiber connector. Therefore, the optical element according to the embodiment of the disclosure effectively solves the problem of low wafer-level measurement efficiency and facilitates mass production of the overall system.

Several exemplary embodiments accompanied with drawings are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
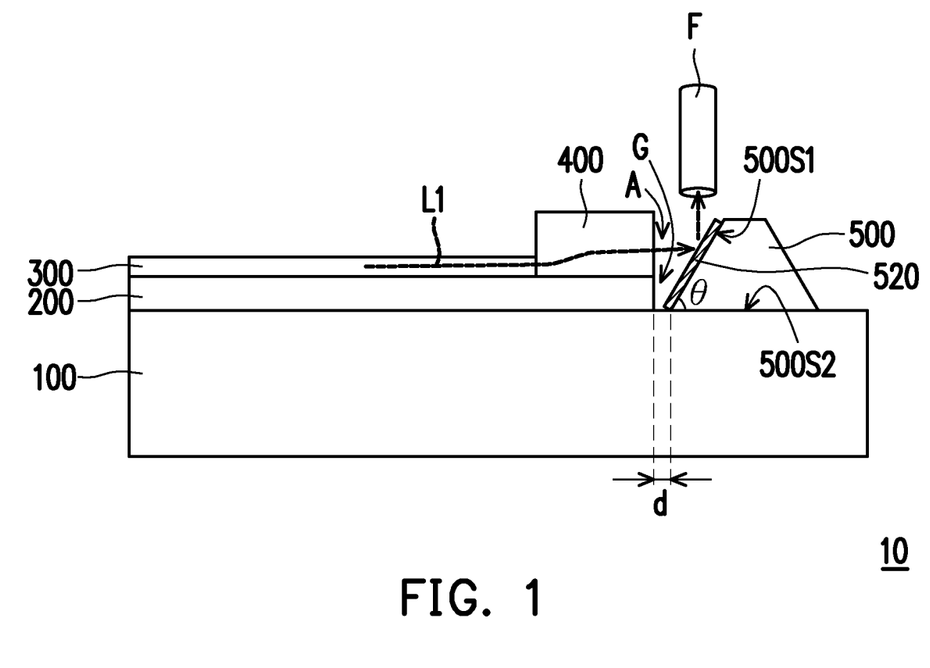
FIG. 1 is a schematic diagram of the optical element according to the first embodiment of the disclosure.

FIG. 1 is a schematic diagram of the optical element according to the first embodiment of the disclosure. Referring to FIG. 1, an embodiment of the disclosure provides an optical element 10, which includes a substrate 100, a first insulating layer 200, a first optical waveguide layer 300, a first edge coupler 400, and a first micro-optical element 500. The first insulating layer 200 is disposed on the substrate 100. The first optical waveguide layer 300 is disposed on the first insulating layer 200 and configured to transmit a light beam L1. The first edge coupler 400 is disposed on the first insulating layer 200 and coupled to an end of the first optical waveguide layer 300. The first micro-optical element 500 is disposed on the substrate 100 and includes a first inclined surface 500S1. A first groove G is formed between the substrate 100, the first insulating layer 200, the first optical waveguide layer 300, and the first edge coupler 400. The first micro-optical element 500 is located within the first groove G. The light beam L1 is sequentially transmitted from the first optical waveguide layer 300 to the first edge coupler 400, emitted from the first edge coupler 400, and reflected by the first inclined surface 500S1 to an optical fiber connector F. In an embodiment, the light beam L1 may be sequentially transmitted from the optical fiber connector F to the first inclined surface 500S1, reflected by the first inclined surface 500S1 to the first edge coupler 400, and transmitted from the first edge coupler 400 to the first optical waveguide layer 300.

In detail, the first groove G is formed by, for example, deep etching the edges of the first edge coupler 400, the first optical waveguide layer 300, and the first insulating layer 200. The first micro-optical element 500 is a micro-optical element having the first inclined surface 500S1 manufacturing by, for example, wet-etching a semiconductor material (such as silicon (Si), silicon nitride (SiN), and silicon oxynitride (SiON)) or metal, which is then packaged in the first groove G with high precision by using a flip chip bonder or the like. Alternatively, the first micro-optical element 500 is a micro-optical element having the first inclined surface 500S1 formed by 3D printing technology with use of, for example, a polymer, which is then packaged in the first groove G with high precision by picking and placing. In another embodiment, the first micro-optical element 500 may also be a mixed structure of silicon, silicon nitride, silicon oxynitride, polymer, metal, etc., and have a refractive index in a range of 1.45 to 3.5, for example, but the disclosure is not limited thereto.

In this embodiment, the first inclined surface 500S1 is coated with a reflective metal layer 520, so that the light beam L1 can be reflected by the first inclined surface 500S1.

In this embodiment, the first micro-optical element 500 further includes a bottom surface 500S2. The bottom surface 500S2 is connected to the first inclined surface 500S1. The first micro-optical element 500 is connected to the substrate 100 through the bottom surface 500S2. An included angle θ between the first inclined surface 500S1 and the bottom surface 500S2 is in a range of 30 degrees to 60 degrees.

In this embodiment, an air gap A is formed between the first micro-optical element 500 and the first edge coupler 400. A distance d between the first micro-optical element 500 and the first edge coupler 400 is in a range of 0.5 μm to 10 μm to keep the transmission distance of the light beam L1 in air short.

Figure 2:
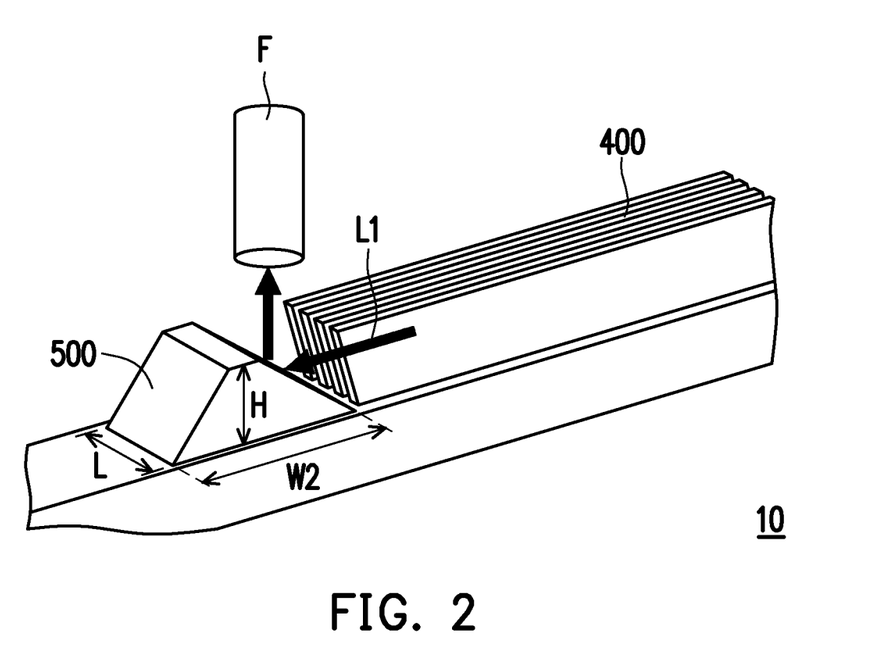
FIG. 2 is an enlarged schematic diagram of the portion of the first micro-optical element in FIG. 1.

FIG. 2 is an enlarged schematic diagram of the portion of the first micro-optical element in FIG. 1. Referring to FIG. 1 and FIG. 2, in this embodiment, a length L of the first micro-optical element 500 in the direction perpendicular to the transmission direction of the light beam L1 in the first optical waveguide layer 300 and perpendicular to the direction from the substrate 100 to the first optical waveguide layer 300 is in a range of 10 μm to 1 mm. The first micro-optical element 500 is disposed beside the first edge coupler 400, and the function of the inclined surface 500S1 is to reflect the light beam L1, turn the light beam L1 upward, and transmit the light beam L1 toward the optical fiber connector F. The geometrical length L of the first micro-optical element 500 is in a range of 10 μm to 1 mm.

In this embodiment, a width W2 of the first micro-optical element 500 in the transmission direction of the light beam L1 in the first optical waveguide layer 300 is in a range of 5 μm to 125 μm.

In this embodiment, a height H of the first micro-optical element 500 in the direction from the substrate 100 to the first optical waveguide layer 300 is in a range of 1 μm to 62.5 μm.

Based on the above, according to an embodiment of the disclosure, since the optical element 10 is provided with the first edge coupler 400, the optical element 10 is suitable for connecting wavelength division multiplexing components in series. Furthermore, the optical element 10 is provided with the first micro-optical element 500 and uses the first micro-optical element 500 to couple the light beam L1 to the optical fiber connector F. Therefore, compared with the conventional optical element using an edge coupler, which needs to cut the wafer in order to measure the photonic chip, the optical element 10 according to the embodiment of the disclosure effectively solves the problem of low wafer-level measurement efficiency and facilitates mass production of the overall system.

In the manufacturing process of the micro-optical element 500, the inclined surface 500S1 may be formed on the optical element 10 by using an etching process directly. Furthermore, the micro-optical element 500 may also be integrated on a side of the first edge coupler 400 by a packaging method (such as a flip-chip bonder) to form a 45-degree reflective inclined surface 500S1, which has several advantages: (1) the geometric structure of the micro-optical element 500 has a large degree of flexibility (as shown in FIG. 3, FIG. 4, FIG. 5A, FIG. 5B, FIG. 6, and FIG. 7); (2) the reflective inclined surface 500S1 is formed by a relatively simple process without using an acid or alkali solution for wet etching; and (3) the temperature for bonding between the micro-optical element 500 and the bottom surface 500S2 is low (for example, 80° C. to 100° C. by PDMS bonding), which does not affect other components that have been completed in the front-end process (note: the thermal budget of a general CMOS back-end process is about 400° C. or less).

Figure 3:
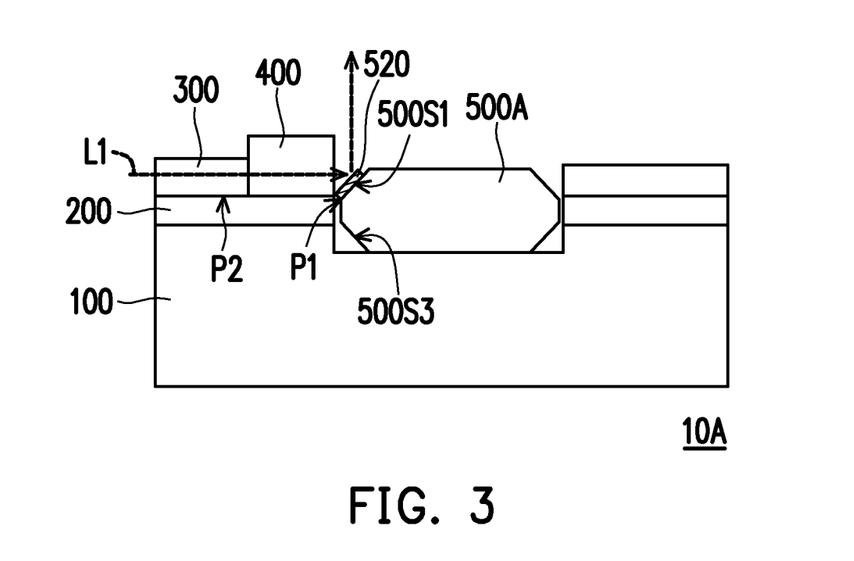
FIG. 3 is a schematic diagram of the optical element according to the second embodiment of the disclosure.

FIG. 3 is a schematic diagram of the optical element according to the second embodiment of the disclosure. Referring to FIG. 3, the optical element 10A is substantially the same as the optical element 10 of FIG. 1, and the main differences are as follows. In this embodiment, the first micro-optical element 500A further includes a second inclined surface 500S3. The second inclined surface 500S3 is opposite to the first inclined surface 500S1 and faces the substrate 100. The second inclined surface 500S3 helps to align the first micro-optical element 500A with the first groove G in the process of picking and placing the first micro-optical element 500A, so as to allow the first micro-optical element 500A to slide into the first groove G automatically.

In this embodiment, in the direction from the first optical waveguide layer 300 to the substrate 100, a bottom position P1 of the first inclined surface 500S1 is lower than a bottom P2 of the first optical waveguide layer 300, which helps to improve the light coupling efficiency of the light beam L1 from the first edge coupler 400 to the first inclined surface 500S1.

Moreover, in this embodiment, the first inclined surface 500S1 is coated with a reflective metal layer 520, so that the light beam L1 can be reflected by the first inclined surface 500S1. The other advantages of the optical element 10A are similar to those of the optical element 10, and will not be repeated here.

Figure 4:
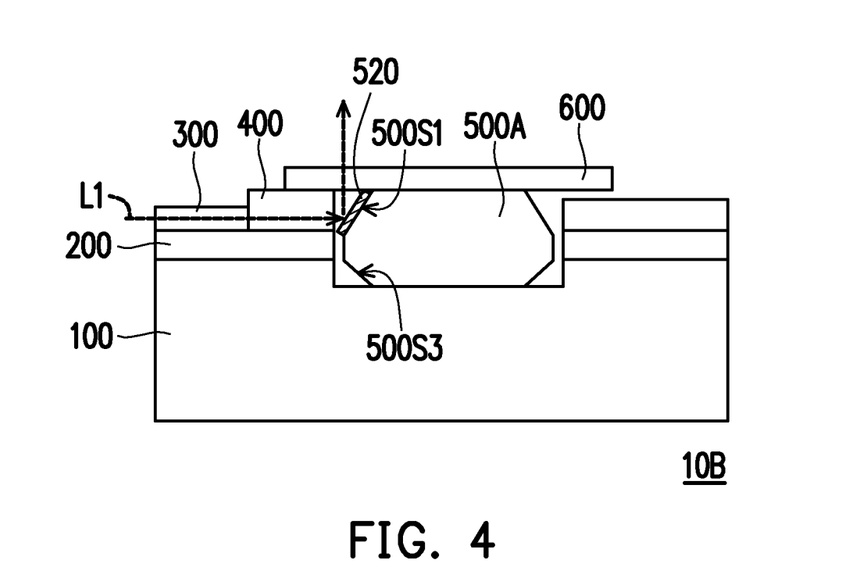
FIG. 4 is a schematic diagram of the optical element according to the third embodiment of the disclosure.

FIG. 4 is a schematic diagram of the optical element according to the third embodiment of the disclosure. Referring to FIG. 4, the optical element 10B is substantially the same as the optical element 10A of FIG. 3, and the main differences are as follows. In this embodiment, the optical element 10B further includes a cantilever structure 600. The cantilever structure 600 is connected to the first micro-optical element 500A. In another embodiment, the cantilever structure 600 may be integrally formed with the first micro-optical element 500A. The cantilever structure 600 is configured to lean on the first edge coupler 400, so that a bottom position of the first inclined surface 500S1 is lower than a bottom of the first optical waveguide layer 300, which improves the light coupling efficiency of the light beam L1 from the first edge coupler 400 to the first inclined surface 500S1. For example, if the first groove G becomes too deep after the etching process, the height at which the first inclined surface 500S1 is arranged may be too low and affect the light coupling efficiency of the optical element. Therefore, providing the cantilever structure 600 can avoid the problem that the first groove G is too deep.

Moreover, in this embodiment, the first inclined surface 500S1 is coated with a reflective metal layer 520, so that the light beam L1 can be reflected by the first inclined surface 500S1. The other advantages of the optical element 10B are similar to those of the optical element 10A, and will not be repeated here.

Figure 5A:
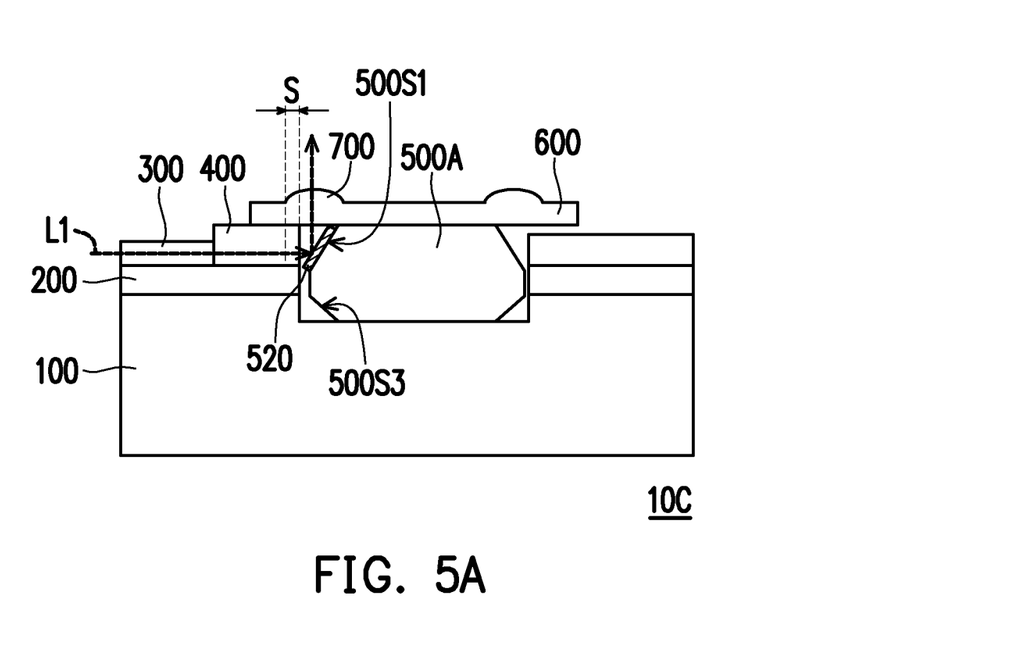
FIG. 5A is a schematic diagram of the optical element according to the fourth embodiment of the disclosure.
Figure 5B:
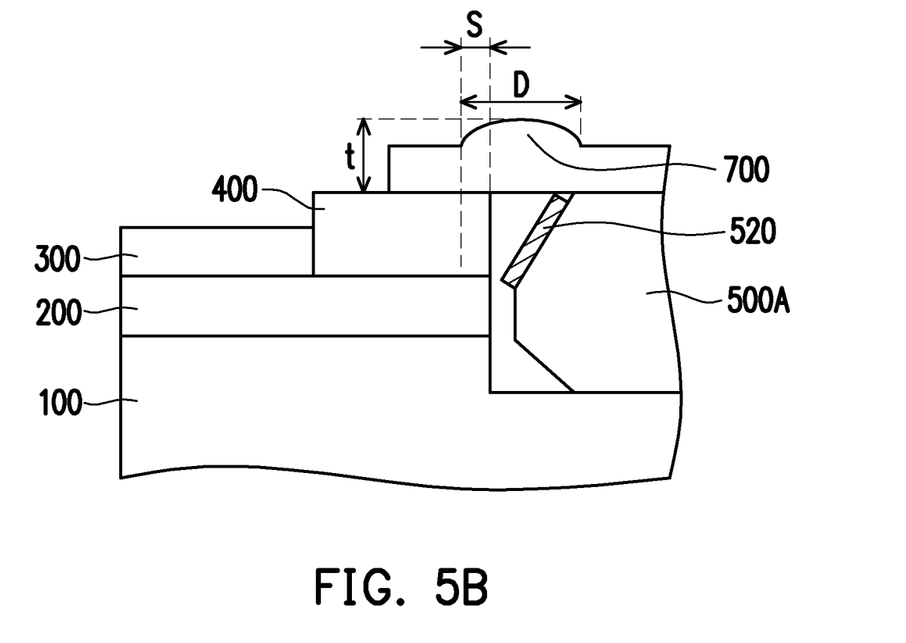
FIG. 5B is an enlarged schematic diagram of the portion of the lens in FIG. 5A.

FIG. 5A is a schematic diagram of the optical element according to the fourth embodiment of the disclosure. FIG. 5B is an enlarged schematic diagram of the portion of the lens in FIG. 5A. Referring to FIG. 5A and FIG. 5B, the optical element 10C is substantially the same as the optical element 10B of FIG. 4, and the main differences are as follows. In this embodiment, the optical element 10C further includes a lens 700. The lens 700 is disposed on the first inclined surface 500S1 and disposed on the transmission path of the light beam L1, and is configured to collimate the light beam L1. In another embodiment, the lens 700 may be integrally formed with the cantilever structure 600, or the lens 700 may be integrally formed with the cantilever structure 600 and the first micro-optical element 500A. After the light beam L1 is emitted from the first edge coupler 400, the light beam L1 is reflected to the lens 700 by the first inclined surface 500S1, passes through the lens 700, and then is transmitted to the optical fiber connector F. Alternatively, the light beam L1 is sequentially transmitted from the optical fiber connector F to the lens 700, transmitted to the first inclined surface 500S1 through the lens 700, and then reflected to the first edge coupler 400 by the first inclined surface 500S1.

In this embodiment, a diameter D of the lens 700 may correspond to the diameter of the optical fiber connector F. For example, the diameter D falls between the diameter of a single-mode optical fiber connector and the diameter of a multi-mode optical fiber connector. In an embodiment, the diameter D of the lens 700 is in a range of 8 µm to 62.5 µm.

In this embodiment, a distance S of an overlapping area between the lens 700 and the first edge coupler 400 is in a range of 0 µm to D/2. A thickness t of the lens 700 is in a range of 50 µm to 1 mm. Since the optical element 10C is provided with the lens 700, the light coupling efficiency is improved.

Moreover, in this embodiment, the first inclined surface 500S1 is coated with a reflective metal layer 520, so that the light beam L1 can be reflected by the first inclined surface 500S1. The other advantages of the optical element 10C are similar to those of the optical element 10B, and will not be repeated here.

Figure 6:
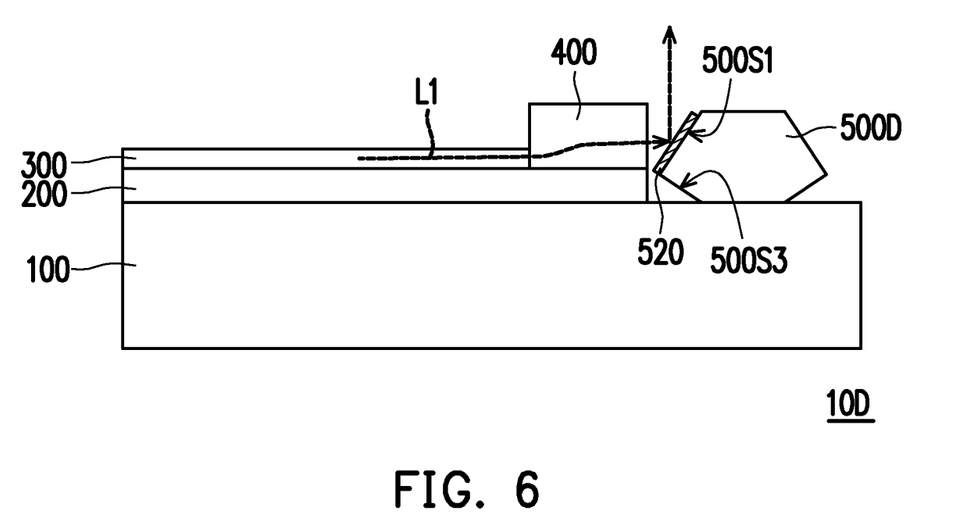
FIG. 6 is a schematic diagram of the optical element according to the fifth embodiment of the disclosure.

FIG. 6 is a schematic diagram of the optical element according to the fifth embodiment of the disclosure. Referring to FIG. 6, the optical element 10D is substantially the same as the optical element 10A of FIG. 3, and the main differences are as follows. In this embodiment, the first inclined surface 500S1 and the second inclined surface 500S3 of the first micro-optical element 500D are directly connected to each other.

Moreover, in this embodiment, the first inclined surface 500S1 is coated with a reflective metal layer 520, so that the light beam L1 can be reflected by the first inclined surface 500S1. The other advantages of the optical element 10D are similar to those of the optical element 10A, and will not be repeated here.

Figure 7:
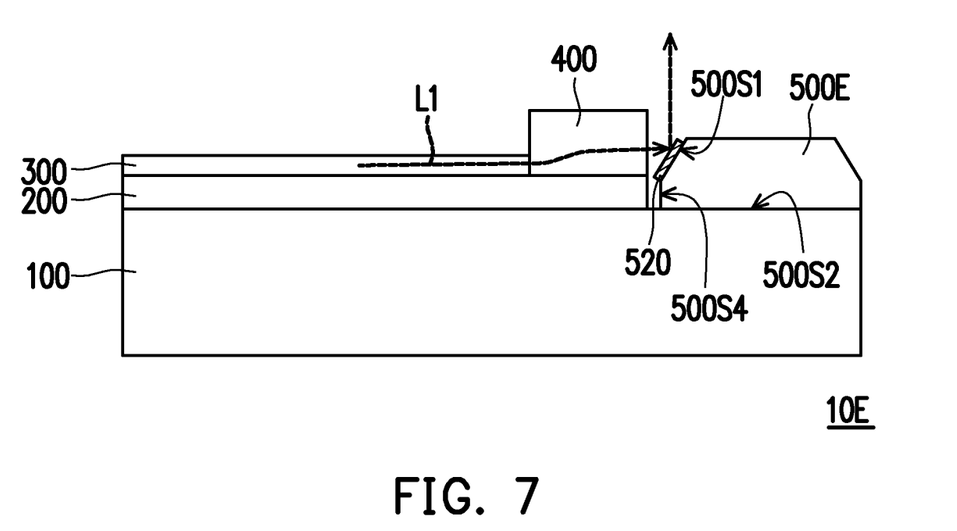
FIG. 7 is a schematic diagram of the optical element according to the sixth embodiment of the disclosure.

FIG. 7 is a schematic diagram of the optical element according to the sixth embodiment of the disclosure. Referring to FIG. 7, the optical element 10E is substantially the same as the optical element 10 of FIG. 1, and the main differences are as follows. In this embodiment, the first micro-optical element 500E further includes a vertical surface 500S4. Two ends of the vertical surface 500S4 are respectively connected to the first inclined surface 500S1 and the bottom surface 500S2.

Moreover, in this embodiment, the first inclined surface 500S1 is coated with a reflective metal layer 520, so that the light beam L1 can be reflected by the first inclined surface 500S1. The other advantages of the optical element 10E are similar to those of the optical element 10, and will not be repeated here.

Figure 8:
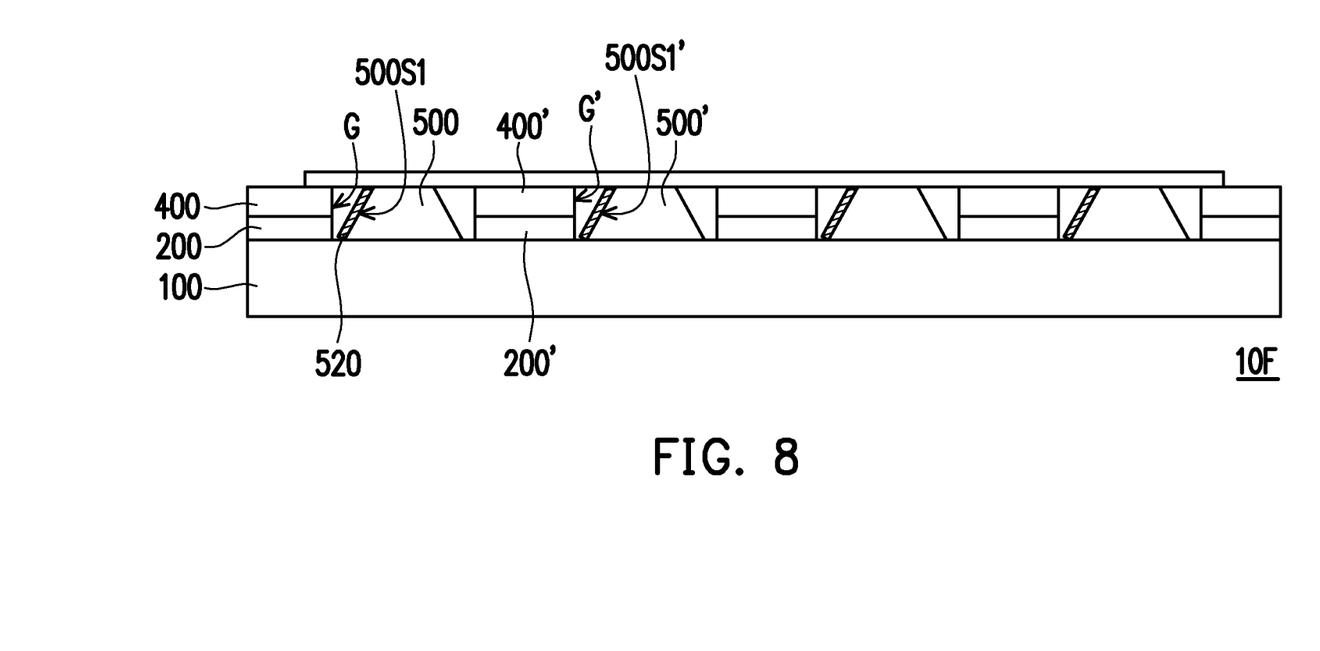
FIG. 8 is a schematic diagram of the optical element according to the seventh embodiment of the disclosure.

FIG. 8 is a schematic diagram of the optical element according to the seventh embodiment of the disclosure. Referring to FIG. 8, the optical element 10F is substantially the same as the optical element 10 of FIG. 1, and the main differences are as follows. In this embodiment, the optical element 10F further includes at least one second insulating layer 200', at least one second optical waveguide layer (not shown in the drawing), at least one second edge coupler 400', and at least one second micro-optical element 500'. The second insulating layer 200' is disposed on the substrate 100. Similar to the first optical waveguide layer 300 of FIG. 1, the second optical waveguide layer is disposed on the second insulating layer 200'. The second edge coupler 400' is disposed on the second insulating layer 200' and is coupled to an end of the second optical waveguide layer (in the direction perpendicular to the paper surface of FIG. 6). The second micro-optical element 500' is disposed on the substrate 100, and the second micro-optical element 500' is located beside the first micro-optical element 500. Each second micro-optical element 500' includes a third inclined surface 500S1'. At least one second groove G' is formed between the substrate 100, the second insulating layer 200', the second optical waveguide layer, and the second edge coupler 400', and the second groove G' is located beside the first groove G. The second micro-optical element 500' is located within the second groove G'.

Each of the first micro-optical element 500 and the second micro-optical elements 500' corresponds to one optical fiber connector on the optical path. That is, the first micro-optical element 500 and the second micro-optical elements 500' may be integrated into the optical element 10F by single transfer or bulk transfer, thereby increasing the data throughput of the overall wafer-level measurement.

Moreover, in this embodiment, the first inclined surface 500S1 and the third inclined surface 500S1' are coated with reflective metal layers 520, so that the light beams can be reflected by the first inclined surface 500S1 or the third inclined surface 500S1'. The other advantages of the optical element 10F are similar to those of the optical element 10, and will not be repeated here.

To sum up, according to an embodiment of the disclosure, since the optical element is provided with the first edge coupler, the optical element is suitable for connecting wavelength division multiplexing components in series. Furthermore, the optical element is provided with the first micro-optical element and uses the first micro-optical element to couple the light beam to the optical fiber connector. Therefore, compared with the conventional optical element using an edge coupler, which needs to cut the wafer in order to measure the photonic chip, the optical element according to the embodiment of the disclosure effectively solves the problem of low wafer-level measurement efficiency and facilitates mass production of the overall system.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical element, comprising:
a substrate;
a first insulating layer disposed on the substrate;
a first optical waveguide layer disposed on the first insulating layer and configured to transmit a light beam;
a first edge coupler disposed on the first insulating layer and coupled to an end of the first optical waveguide layer; and
a first micro-optical element disposed on the substrate and comprising a first inclined surface,
a first groove is formed between the substrate, the first insulating layer, the first optical waveguide layer, and the first edge coupler, and the first micro-optical element is located within the first groove, and
the light beam is sequentially transmitted from the first optical waveguide layer to the first edge coupler, emitted from the first edge coupler, and reflected by the first inclined surface to an optical fiber connector,
wherein the first micro-optical element further comprises a second inclined surface, and the second inclined surface is opposite to the first inclined surface and faces the substrate, and
a bottom position of the first inclined surface is lower than a bottom of the first optical waveguide layer in a direction from the first optical waveguide layer to the substrate.

2. The optical element according to claim 1, wherein the first inclined surface is coated with a reflective metal layer.

3. The optical element according to claim 1, wherein the first micro-optical element further comprises a bottom surface, the bottom surface is connected to the first inclined surface, and the first micro-optical element is connected to the substrate through the bottom surface, and
an included angle between the first inclined surface and the bottom surface is in a range of 30 degrees to 60 degrees.

4. The optical element according to claim 3, wherein the first micro-optical element further comprises a vertical surface, and two ends of the vertical surface are respectively connected to the first inclined surface and the bottom surface.

5. The optical element according to claim 1, wherein an air gap is formed between the first micro-optical element and the first edge coupler.

6. The optical element according to claim 1, wherein the first inclined surface and the second inclined surface are directly connected to each other.

7. The optical element according to claim 1, further comprising:
at least one second insulating layer disposed on the substrate;
at least one second optical waveguide layer disposed on the at least one second insulating layer;
at least one second edge coupler disposed on the at least one second insulating layer and coupled to an end of the at least one second optical waveguide layer; and
at least one second micro-optical element disposed on the substrate, wherein each of the at least one second micro-optical element comprises a third inclined surface,
wherein at least one second groove is formed between the substrate, the at least one second insulating layer, the at least one second optical waveguide layer, and the at least one second edge coupler, and the at least one second micro-optical element is located within the at least one second groove.

8. The optical element according to claim 1, further comprising:
a lens arranged on the first inclined surface, disposed on a transmission path of the light beam, and configured to collimate the light beam,
wherein the light beam is emitted from the first edge coupler and then reflected to the lens by the first inclined surface.

9. The optical element according to claim 8, wherein a distance of an overlapping area between the lens and the first edge coupler is in a range of 0 µm to D/2, where D is a diameter of the lens.

10. An optical element, comprising:
a substrate;
a first insulating layer disposed on the substrate;
a first optical waveguide layer disposed on the first insulating layer and configured to transmit a light beam;
a first edge coupler disposed on the first insulating layer and coupled to an end of the first optical waveguide layer; and
a first micro-optical element disposed on the substrate and comprising a first inclined surface,
a first groove is formed between the substrate, the first insulating layer, the first optical waveguide layer, and the first edge coupler, and the first micro-optical element is located within the first groove, and
the light beam is sequentially transmitted from the first optical waveguide layer to the first edge coupler, emitted from the first edge coupler, and reflected by the first inclined surface to an optical fiber connector,
wherein the first micro-optical element is in direct contact with the substrate at a surface of the first groove farthest away from the first edge coupler in a direction of the first micro-optical element towards the substrate,
wherein the first micro-optical element further comprises a second inclined surface, and the second inclined surface is opposite to the first inclined surface and faces the substrate, and
a bottom position of the first inclined surface is lower than a bottom of the first optical waveguide layer in a direction from the first optical waveguide layer to the substrate.

11. The optical element according to claim 10, further comprising:
at least one second insulating layer disposed on the substrate;
at least one second optical waveguide layer disposed on the at least one second insulating layer;
at least one second edge coupler disposed on the at least one second insulating layer and coupled to an end of the at least one second optical waveguide layer; and at least one second micro-optical element disposed on the substrate, wherein each of the at least one second micro-optical element comprises a third inclined surface, wherein at least one second groove is formed between the substrate, the at least one second insulating layer, the at least one second optical waveguide layer, and the at least one second edge coupler, and the at least one second micro-optical element is located within the at least one second groove.

12. The optical element according to claim 10, wherein the first inclined surface is coated with a reflective metal layer.

13. The optical element according to claim 10, wherein the first micro-optical element further comprises a bottom surface, the bottom surface is connected to the first inclined surface, and the first micro-optical element is connected to the substrate through the bottom surface, and an included angle between the first inclined surface and the bottom surface is in a range of 30 degrees to 60 degrees.

14. The optical element according to claim 13, wherein the first micro-optical element further comprises a vertical surface, and two ends of the vertical surface are respectively connected to the first inclined surface and the bottom surface.

15. The optical element according to claim 10, wherein an air gap is formed between the first micro-optical element and the first edge coupler.

16. The optical element according to claim 1, wherein the first inclined surface and the second inclined surface are directly connected to each other.

17. The optical element according to claim 10, further comprising:

a lens arranged on the first inclined surface, disposed on a transmission path of the light beam, and configured to collimate the light beam, wherein the light beam is emitted from the first edge coupler and then reflected to the lens by the first inclined surface.

18. The optical element according to claim 17, wherein a distance of an overlapping area between the lens and the first edge coupler is in a range of 0 μm to D/2, where D is a diameter of the lens.

* * * * *